United States Patent [19]
Bassi et al.

[11] Patent Number: 5,665,152
[45] Date of Patent: Sep. 9, 1997

[54] BIODEGRADABLE GRAIN PROTEIN-BASED SOLID ARTICLES AND FORMING METHODS

[75] Inventors: Sukh Bassi, Atchison, Kans.; Clodualdo C. Maningat, Platte City, Mo.; Rangaswamy Chinnaswamy; Li Nie, both of Kansas City, Mo.

[73] Assignee: Midwest Grain Products, Atchison, Kans.

[21] Appl. No.: 745,106

[22] Filed: Nov. 7, 1996

Related U.S. Application Data

[63] Continuation-in-part of Ser. No. 564,707, Nov. 29, 1995, abandoned.
[51] Int. Cl.$^6$ .................. C09D 189/00; C09D 103/02
[52] U.S. Cl. .................. 106/145.1; 106/125.1; 106/126.1; 106/145.5; 106/145.3
[58] Field of Search .................. 106/125.1, 126.1, 106/145.1, 145.5, 145.3

[56] References Cited

U.S. PATENT DOCUMENTS 2,309,113  1/1943  Huppert.
3,615,715  10/1971 Mullen.
4,935,257  6/1990  Yajima.

FOREIGN PATENT DOCUMENTS 2406471  of 1971  Japan.
9414886  7/1994  WIPO.

OTHER PUBLICATIONS

Gennadios et al.; Modification of Physical and Barrier Properties of Edible Wheat Gluten–Based Films; Cereal Chem. 70(4): 426–429 No Date Available.
Meester; Extraction et utilisation de la gliadine et de la glutenine due froment (Jan. 1974;) Industries Alimentaires et Agricoles 91 Annee.
Goforth et al.; Separation of Glutenin from Gliadin by Ultracentrifugation; Cereal Chem.; 53 (4) 608–612 No Date Available.
Gennadios et al.; Moisture Absorption by Grain Protein Films; Transactions of the ASAE; vol. 37(2):535–539 No Date Available.
Chem. Ab No. 121:257510z; Kawaguchi et al.; Gluten sheets and manufacture thereof and cleaning tools using the same for dust pickup on contact No Date Available.
Chem Ab No. 121:156095n; Gennadios et al.; Water vapor permeability of wheat gluten and soy protein isolate films No Date Available.
Chem Ab. No. 120:219267x; Yashi et al.; Development of biodegradable gluten plastics No Date Available.
Chem Ab No. 119:182230f; Makoto; Biodegradable plastics derived from poly(amino acids) No Date Available.
Chem Ab No. 119:74215w; Domae et al.; Gluten moldings and their manufacture No Date Available.
Chem Ab. No. 117:9072s; Domae et al.; Biodegradable plastics containing gluten No Date Available.

Chem Ab. No. 116:256890h; Yamashita; Development trends on biodegradable plastics No Date Available.
Sato; Proteins of the soy bean and their industrial application; J. Chem. Ind. Tokyo 23, 1–25 (1920) No Date Available.
Sato; Proteins of the soy bean and their industrial application; J. Chem. Ind. (Japan) 23, 425–39 (1920) No Month Available.
Davies et al.; Plasticisation and Mechanical Properties of Heat–Set Wheat Gluten; International Workshop on Gluten Proteins (1990) No Month Available.
Chem Ab No. 121:281872q; Hasagawa et al.; Biodegradable thermoplastic composition from corn gluten meal and its preparation No Date Available.
Gennadios et al.; Edible Films and Coatings from Soymilk and Soy Protein; Cereal Foods World; (Dec. 1991) Vol. 36, No. 12.
Yasui et al.; Development of biodegradable gluten plastic; Kobunshi Kako (1991) No Month Available 40(8), 407–11.
Tolstoguzov; Thermoplastic Extrusion—The Mechanism of the Formation of Extrudate Structure and Properties; JAOCS, vol. 70, No. 4 (Apr. 1993).
Prudencio–Ferreira et al.; Protein–Protein Interactions in the Extrusion of Soya at Various TEmperatures and Moisture Contents; J. Food Science, vol. 58, No. (1993;) No Month Available 378–381.
Paetau et al.; Biodegradable Plastic Made from Soybean Products. 1 Effect of Preparation and Processing on Mechanical Properties and Water Absorpotion; Ind. Eng. Chem. Res (1994,) No Month Available 33, 1821–1827.
De Deken et al.; Wheat gluten. II. Action of reducing agents; Biochim. et Biophys. Acta 16, 566–9(1955) No Month Available.
Matsumoto; Breadmaking. XII. The mechanism of $NaHSO_3$ effect on gluten; J. Fermentation Technol. 33, 235–7 (1955) No Month Available.
Wada et al.; Studies on the production of artificial plastic masses from soybean protein; J. Soc. Chem. Ind., Japan 42, Suppl. binding 317–18 (1939) No Month Available.

(List continued on next page.)

Primary Examiner—David Brunsman
Attorney, Agent, or Firm—Hovey, Williams, Timmons & Collins

[57] ABSTRACT

A method of forming solid, non-edible biodegradable, grain protein-based articles is provided wherein a grain protein formulation is heated to a maximum temperature of up to about 80° C. to create a substantially homogeneous and flowable mixture which can be formed into biodegradable articles. The formulation includes from about 20–85% by weight of grain protein, from about 5–75% by weight starch, up to about 14% by weight water, from about 10–40% by weight plasticizer, and at least about 0.01 by weight of a reducing agent such as sodium bisulfite for cleaving disulfide bonds present in the grain protein. Optional ingredients such as fillers, fiber, lubricant/mold release agents and colorants can also be used. The formulations can be processed in extrusion or injection molding equipment to create solid articles.

45 Claims, No Drawings

OTHER PUBLICATIONS

Chem Ab No. 122:316010g; Kubota et al.; Biodegradable plastics obtained from water–in–soluble corn proteins; No Date Available.

Chem Ab. No. 122: 263837y; Gontard; Edible wheat gluten films: optimization of the main process variables and improvement of water vapor barrier properties by combining gluten proteins with lipids No Date Available.

Chem Ab. No. 122:135036z; Nishiyama et al.; Investigation on research for degradable plastics No Date Available.

Chem Abs Nos. 122:29919e–29926e; 17–Food, Feed Chem.; vol. 122 (1995) No Month Available.

Chem Ab No. 119:265990e; Ando; Biodegradable protein products for use as packaging mateiral or container No Date Available.

Chem Ab. No. 119:119103b; Nagai et al.; Biodecomposable thermoplastic moldings and their manufacture No Date Available.

Chem Ab. No. 19008d; Anker et al.; Shaped articles by extruding nonthermally coagulable simple proteins No Date Available.

Cherian et al.; Thermomechanical Behavior of Wheat Gluten Films: Effect of Sucrose, Glycerin and Sorbitol; 2 Cereal Chem.; vol. 72, No. 1 (1995) No Month Available.

Park et al.; Water Vapor Permeability and Mechanical Properties of Grain Protein–Based Films as Affected by Mixtures of Polyethylene Glycol and Glycerin Plasticizers; Transactions of the ASAE; vol. 37(4):1281–1285 (1994) No Month Available.

BIODEGRADABLE GRAIN PROTEIN-BASED SOLID ARTICLES AND FORMING METHODS

This is a continuation-in-part of application Ser. No. 08/564,707, filed Nov. 29, 1995, now abandoned.

BACKGROUND OF THE INVENTION

1. Field of the Invention

The present invention is broadly concerned with a method of forming solid, non-edible biodegradable articles such as eating utensils, cups, plates, sheet items, packaging, and other convenience products. More particularly, the invention pertains to such methods and the resultant formed articles wherein a formulation including naturally occurring grain protein, starch, plasticizer and a reducing agent operable for cleaving disulfide bonds present in the grain protein as well as optional ingredients, lubricants, fillers, and mold releasing agents is prepared and heated under relatively low temperature conditions in order to render the formulation substantially homogeneous and flowable; the formulation can then be injection molded, extruded or otherwise formed to give complete biodegradable articles.

2. Description of the Prior Art

Petroleum-based synthetic resins have achieved widespread use in the fabrication of a multitude of products. To give but one example, single or limited use items such as eating utensils and cups are commonly produced using synthetic resins, e.g., polyethylene, polystyrene or polypropylene. While such items are nominally "disposable", in reality they are largely indestructible owing to the long-lived properties of the synthetic resin. As a consequence, there is a growing concern about the indiscriminate use of petroleum-based synthetic resins, and their accumulation in the environment.

One response to this problem has been the development of biodegradable plastic materials which degrade in a relatively short period of time under normal environmental or composting conditions of temperature, humidity and the action of microorganisms. Research in this area was quite active in the 1930s and 40s, particularly in the context of soybean-derived plastics. At that time, soybean products were incorporated into phenolic resins as a filler or extender, and to enhance biodegradability. Subsequent research has led to products having improved biodegradation rates. For example, products have been developed which employ starch as fillers in petroleum-based plastics. In addition, inherently biodegradable polymers have also been proposed using starch and plant proteins as primary ingredients while essentially avoiding synthetic resins. The latter class of biodegradable products are particularly attractive, inasmuch as plant protein sources are relatively low in cost, renewable, and are readily available. Many of the processes involving wholly biodegradable plastics have involved compression molding.

Thus, extensive work has been done on the processing of gelatinized starch into molded articles. A major problem with starch-based products is water sensitivity. In an attempt to overcome this obstacle, it is known to blend starches with other synthetic resin polymers, to modify the starch to make it more hydrophobic, or to convert starch into glucose and fermenting the glucose into monomers suitable for use in preparing biodegradable polymers.

Grain proteins are one family of biomaterials which have received relatively scant attention as raw materials for wholly biodegradable products. Grain proteins normally exhibit better moisture resistance than starch, but exhibit significant processing problems such as altered rheology and flow characteristics, especially under conditions of heat denaturation. As a consequence, it can be very difficult to economically process grain protein-based plastics using conventional extrusion and injection molding equipment. These problems are believed to stem in part from the highly branched and networked structure of grain proteins and their ease of denaturation under normal processing temperatures.

U.S. Pat. No. 3,615,715 describes the production of non-edible sausage casing films from nonheat coagulable proteins using an extrusion device. An essential feature of the production process disclosed in this patent is time-temperature and moisture conditions which yield denatured film products.

There is accordingly a need in the art for improved techniques for forming biodegradable articles which essentially avoid environmentally deleterious synthetic resins but permits economical fabrication of finished articles using high speed extrusion and injection molding equipment.

SUMMARY OF THE INVENTION

The present invention overcomes the problems outlined above and provides an improved method of forming biodegradable non-edible solid articles using essentially completely biodegradable starting materials and avoiding petroleum-based synthetic resins. Broadly speaking, the method of the invention first comprises the step of providing a formulation especially designed to have flow and rheology properties allowing the formulation to be processed using conventional plastics forming equipment. This formulation is then heated under moderate temperature conditions, usually with shear, to create a substantially homogeneous and flowable formulation. The heated formulation can then be formed into desired articles using injection molding, extrusion or other forming equipment. Very importantly, the formulation is prepared as a substantially homogeneous and flowable product with the avoidance of any substantial heat denaturation of the grain protein (normally less than about 10% by weight denaturation of such protein). Thereafter, during the formation of the final desired articles, the substantially undenatured protein is denatured. Thus in the context of injection molding, the preferred temperature conditions of molding assure essentially complete protein denaturation.

In more detail, the preferred protein-based formulation includes from about 20–85% by weight grain protein, and more preferably from about 30–70% by weight grain protein. Although a variety of grain proteins can be employed, most preferably the protein is selected from the group consisting of soy protein, wheat gluten, corn gluten and mixtures thereof. In preferred forms, the grain protein has substantially no heat denaturation and as used is naturally occurring. Normally, for reasons of economy and ease of formulation, the grain protein is provided as a part of a mixture which would typically include ingredients such as starch, lipids, bran and mixtures thereof. For example, soy meals, concentrates and isolates could be used, as well as various commercial grades of wheat and corn gluten. When such mixtures are used, typically they would comprise at least about 50% by weight of the desired grain protein, and more preferably at least about 75% by weight thereof.

The formulations of the invention should also include from about 5–75% by weight starch, and more preferably from about 10–70% by weight thereof. Again, a variety of starches could be used, such as those taken from the group consisting of corn, wheat, potato and tapioca starches and mixtures thereof. The starches can be native or modified by gelatinization or chemical treatment (e.g., oxidized, acetylated, carboxymethyl, hydroxyethyl, hydroxy-propyl, high amylose, and alkyl-modified starches).

The extrudable formulations of the invention also include a minor amount of water, up to 14% by weight, more preferably up to about 12% by weight, and most preferably from about 2-10% by weight. The presence of excess water leads to a sticky, stretchy extrudate not at all suitable for use in the formation of solid non-edible products pursuant to the invention.

A plasticizer when employed is normally used at a level of from about 10-40% by weight in the starting formulations, and more preferably from about 20-35% by weight. The preferred class of plasticizers include those selected from the group consisting of glycerol, diglycerol, propylene glycol, triethylene glycol, urea, sorbitol, mannitol, maltitol, hydrogenated corn syrup, polyvinyl alcohol, polyethylene glycol, $C_{12}$-$C_{22}$ fatty acids and metal salts of such fatty acids, and mixtures thereof. The most preferred plasticizer is glycerol.

The reducing agent is a very important component of the formulations of the invention. This ingredient drastically improves the flow and mixing of the grain protein in the processing equipment, rendering the overall formulation suitable for use therein. The reducing agent also serves to enhance the final products in terms of appearance, mechanical properties and moisture resistance. The reducing agent should be present in a minor amount of at least about 0.01% by weight, and more preferably from about 0.05-3% by weight, where these weights are based upon the total amount of grain protein being taken as 100% by weight. The reducing agents are advantageously selected from the group consisting of the alkali metal and ammonium sulfites, bisulfites, metabisulfites and nitrites, and mercaptoethanol, cysteine, cysteamine, ascorbic acid and mixtures thereof.

Normally, the reducing agent is simply added to the other components of the formulation prior to or as a part of the extrusion process. Alternately, the reducing agent can be used to preliminarily treat the selected grain protein(s) prior to preparation of the starting formulation. Thus, in the case of glutens, the reducing agent may be initially added to obtain a modified gluten product which then is employed as a part of the extrusion formulation. In any case, the reducing agent should be used in an amount to cleave from about 10-100% of the disulfide bonds in the grain protein.

A number of other ingredients can also be used in the starting extrusion formulations. For example, such ingredients as fillers, fiber and lubricant/mold release agents can be used to good effect. Fillers may include titanium dioxide, carbon black, talc and carbonate salts, and are normally present at a level of from about 1-25% by weight. The fiber may be any type of cellulosic fiber and is normally used at a level of from about 1-60% by weight. The lubricant/mold release agent is preferably selected from the group consisting of vegetable and animal oils and fats, the alkali metal and alkaline earth stearates and mixtures thereof. Such agents are typically present at a level of about 0.1-5% by weight, and may include corn oil, bees wax, glycerol monostearate, sodium stearate, and magnesium stearate. If desired, minor amounts of colorant can be added to the starting formulations (e.g., azo dyes, chlorophyll, xanthophyll, carotene, indigo, iron and titanium oxides, carbon black.)

If corn gluten is used as the primary grain protein starting material, it may be pretreated with a selected reducing agent and a fatty acid or fatty acid salt in an aqueous ammonia solution to form a dispersion at a temperature below about 80° C. This dispersion can then be spray dried to give a modified corn gluten.

The formulations of the invention can be formed into pellets which can later be used in injection molding equipment. For example, such pellets may be formed by extrusion, using either single or twin screw extruders. However, it is important to maintain the temperature of the material within the extruder barrel below about 80° C. to avoid heat denaturation of the protein content of the formulation. Extruded pellets of this character would generally be maintained in closed containers and would have a moisture content on the order of from about 5-14% by weight.

The formulations of the invention, either as previously prepared pellets or as virgin formulations, can be used in conventional injection molding equipment. As in the case of extrusion processing, the melt temperature inside the barrel of the injection molder should be maintained to a level of up to about 80° C., and more preferably up to about 65° C. (indeed, it is preferred that the initial formulation and forming steps be carried out so that the formulation experiences a maximum temperature of up to about 65° C.). However, the mold itself would normally be heated to a temperature of from about 120°-180° C., in order to substantially completely denature the grain protein fraction of the formulation introduced into the injection mold. The other parameters of injection molding such as cycle time (ranging from a few seconds to a few minutes) are essentially conventional.

To give but one example, an extruder equipped with a slit die may be used for creating a sheet-type extrudate. The extrudate would normally be fed through downstream heated calendering rolls (usually maintained at a temperature of from about 60°-200° C.) for final surface polish and thickness control. Normally, the thickness of such sheeting would be at least about 0.1 mm. During calendering, the extrudate would normally be partially dried and the heated rolls would at least partially denature the protein content of the extrudate. Depending upon the starting formulation, the extrudates can have variable light transmittance ranging from transparent to opaque. The sheet products after calendering can be rolled and stored for further processing, e.g., pressure/vacuum-assisted thermal forming.

A variety of extrusion equipment may be used in the practice of the invention, so long as the equipment is designed to maintain the relatively low temperature conditions within the extruder barrel. To this end, single or twin screw extruders can be employed, with screw configurations that generate relatively low temperatures in the grain protein melt of less than about 80° C. and more preferably up to about 65° C. If shaped articles such as eating utensils are contemplated, normally the extruder is equipped to feed an injection mold. Thus, the extrudate is fed directly into an injection mold (normally heated to a temperature of from about 120°-180° C.) in the well known manner. If sheet goods are desired, the extrudate may be passed through a slotted die and into calendering rolls for thickness control and surface polish. During calendering, it is preferred to heat the calendering rolls to a temperature of from about 120°-200° C. This serves to partially cure and dry the extrudate and to substantially completely denature the grain protein. Depending on the formulations and processing conditions, the resultant sheets can be transparent or opaque. The sheet products can be rolled and stored for further processing, e.g., pressure/vacuum-assisted thermal forming.

DESCRIPTION OF THE PREFERRED EMBODIMENT

The following examples illustrate certain preferred formulations and manufacturing techniques for the production of solid biodegradable articles in accordance with the invention. It is to be understood that these examples are provided by way of illustration only and nothing therein should be taken as a limitation upon the overall scope of the invention.

EXAMPLES 1–7

In Example 1 below, a formulation was employed for the injection molding of large, flat annular washers. All ingredients except for the plasticizer glycerol were premixed to obtain substantial homogeneity, and these ingredients were fed into the inlet of a laboratory Haake co-rotating twin screw extruder. The glycerol was injected into the extruder barrel slightly downstream of the barrel inlet. The extruder screws were rotated at 60 rpm and the electrical barrel heater was set at 60° C. The extrudate was used in an injection molder where the mold was equipped with an electrical temperature controller set at 155° C. The cycle time of the injection molding was 12 seconds. The remaining examples 2–7 hereof are hypothetical. The following table sets forth the ingredients in each example 1–7 in parts by weight.

TABLE

| Ingredients (Parts by Wt.) | Example 1 | Example 2 | Example 3 | Example 4 | Example 5 | Example 6 | Example 7 |
|---|---|---|---|---|---|---|---|
| wheat gluten[1] | 80 | 50 | 70 | 50 | 80 | — | — |
| soy concentrate[2] | — | — | — | — | — | 80 | — |
| corn gluten[3] | — | — | — | — | — | — | 80 |
| starch[4] | — | 50 | — | — | — | — | — |
| gelatinized starch[5] | — | — | 30 | — | — | — | — |
| cellulose fiber[6] | — | — | — | 50 | — | — | — |
| wood fiber[7] | — | — | — | — | 20 | — | — |
| glycerol | 20 | 12.5 | 25 | 17 | 20 | 20 | 20 |
| water | 2 | 12.5 | 2 | 3 | 3 | 2 | 2 |
| sodium bisulfite | 0.2 | 0.2 | 0.2 | 0.2 | 0.2 | 0.15 | 0 |
| glycerol monostearate | 0.4 | 0.3 | 0.4 | 0.3 | 0.5 | 0.5 | 0.5 |
| Mg stearate | 1.6 | 1.2 | 1.2 | 1.2 | 1.5 | 1.5 | 0 |
| colorants | — | — | — | — | — | 0.5 green | 1.0 pearl |

[1]Vital wheat gluten from Midwest Grain Products, Inc.
[2]Soy protein concentrate from Archer Daniel Midland
[3]Corn gluten slurry from Cargill, spray dried by dispersing in 1% ammonia water containing 0.4% by weight sodium metabisulfite and 10% by weight stearic acid based on the solid content of the slurry taken as 100% by weight. The temperature of the dispersion was 50° C.
[4]Pearl starch from Midwest Grain Products, Inc.
[5]Gelatinized starch from Midwest Grain Products, Inc.
[6]Solka-Floc from Protein Technologies Int.
[7]310 Sisal Fiber from International Filler Corporation.

In practice, it is found that the proper grain protein formulations must be used in the invention, together with the appropriate processing conditions. If the processing conditions are correct but the formulation does not have the necessary ingredients, no useful products will be made. Similarly, if the correct formulations are used but improperly processed, the final products will be deficient.

We claim:

1. A method of forming a biodegradable article comprising the steps of:
   providing a formulation comprising from about 20–85% by weight of grain protein, from about 5–75% by weight starch, from about 10–40% by weight plasticizer and at least about 0.01% by weight of a reducing agent operable for cleaving disulfide bonds present in said grain protein; and
   heating said formulation to a maximum temperature of up to about 80° in order to render the formulation substantially homogeneous and flowable while avoiding any substantial heat denaturation of said grain protein; and
   molding said heated formulation into a biodegradable article, including the step of substantially denaturing said grain protein during said molding.

2. The method of claim 1, said formulation having from about 30–70% by weight grain protein.

3. The method of claim 1, said formulation having from about 10–70% by weight starch.

4. The method of claim 1, said formulation having from about 20–35% by weight plasticizer.

5. The method of claim 1, formulation having from about 0.05–3% by weight reducing agent, based upon the amount of said grain protein being taken as 100% by weight.

6. The method of claim 1, said grain protein being selected from the group consisting of soy protein, wheat gluten, corn gluten, and mixtures thereof.

7. The method of claim 6, said grain protein being wheat gluten.

8. The method of claim 1, said starch being selected from the group consisting of corn, wheat, potato, and tapioca starches and mixtures thereof.

9. The method of claim 1, said plasticizer being selected from the group consisting of glycerol, diglycerol, propylene glycol, triethylene glycol, urea, sorbitol, mannitol, maltitol, hydrogenated corn syrup, polyvinyl alcohol, polyethylene glycol, $C_{12}$–$C_{22}$ fatty acids and metal salts of such fatty acids, and mixtures thereof.

10. The method of claim 9, said plasticizer being glycerol.

11. The method of claim 1, said reducing agent being selected from the group consisting of the alkali metal and ammonium sulfites, bisulfites, metabisulfites and nitrites, and mercaptoethanol, cysteine, cysteamine, ascorbic acid and mixtures thereof.

12. The method of claim 1, said formulation including a filler selected from the group consisting of titanium dioxide, carbon black, talc and carbonate salts.

13. The method of claim 12, said filler being present at a level of from about 1–25% by weight.

14. The method of claim 1, said formulation including a quantity of fiber therein.

15. The method of claim 14, said fiber being present at a level of from about 1–60% by weight.

16. The method of claim 1, said formulation including a quantity of a lubricant/mold release agent selected from the group consisting of vegetable and animal oils and fats, the alkali metal and alkaline earth stearates and mixtures thereof.

17. The method of claim 16, said lubricant mold release agent being present at a level from about 0.1-5% by weight.

18. The method of claim 1, said formulation including a minor amount of a colorant therein.

19. The method of claim 1, said grain protein being provided as a part of a mixture including other ingredients selected from the group consisting of starch, lipids, bran and mixtures thereof.

20. The method of claim 19, said mixture comprising at least about 75% by weight of said grain protein.

21. The method of claim 1 said water being present at a level of from about 2-10% by weight.

22. The method of claim 1, said heating and forming steps being carried out so that the formulation is heated to a maximum temperature of up to about 65° C.

23. The method of claim 1, said molding step being carried out in injection molding equipment.

24. A method of forming protein-containing pellets which can be used in injection molding equipment for the production of biodegradable articles, that method comprising the steps of:

providing a formulation comprising from about 20-85% by weight of grain protein, from about 5-75% by weight starch, from about 10-40% by weight plasticizer and at least about 0.01% by weight of a reducing agent operable for cleaving disulfide bonds present in said grain protein; and heating said formation and forming said pellets by extrusion, said heating step being carried out so that the formulation heated to a maximum temperature of up to about 80° C. in the extruder in order to render the formulation substantially homogeneous and flowable, with the avoidance of any substantial heat denaturation of said grain protein in said pellets.

25. The method of claim 24, said maximum temperature being up to about 65° C.

26. The method of claim 24, said formulation having from about 30-70% by weight grain protein.

27. The method of claim 24, said formulation having from about 10-70% by weight starch.

28. The method of claim 24, said formulation having from about 20-35% by weight plasticizer.

29. The method of claim 24, formulation having from about 0.05-3% by weight reducing agent, based upon the amount of said grain protein being taken as 100% by weight.

30. The method of claim 24, said grain protein being selected from the group consisting of soy protein, wheat gluten, corn gluten, and mixtures thereof.

31. The method of claim 30, said grain protein being wheat gluten.

32. The method of claim 24, said starch being selected from the group consisting of corn, wheat, potato, and tapioca starches and mixtures thereof.

33. The method of claim 24, said plasticizer being selected from the group consisting of glycerol, diglycerol, propylene glycol, triethylene glycol, urea, sorbitol, mannitol, maltitol, hydrogenated corn syrup, polyvinyl alcohol, polyethylene glycol, $C_{12}-C_{22}$ fatty acids and metal salts of such fatty acids, and mixtures thereof.

34. The method of claim 33, said plasticizer being glycerol.

35. The method of claim 24, said reducing agent being selected from the group consisting of the alkali metal and ammonium sulfites, bisulfites, metabisulfites and nitrites, and mercaptoethanol, cysteine, cysteamine, ascorbic acid and mixtures thereof.

36. The method of claim 24, said formulation including a filler selected from the group consisting of titanium dioxide, carbon black, talc and carbonate salts.

37. The method of claim 36, said filler being present at a level of from about 1-25% by weight.

38. The method of claim 24, said formulation including a quantity of fiber therein.

39. The method of claim 38, said fiber being present at a level of from about 1-60% by weight.

40. The method of claim 24, said formulation including a quantity of a lubricant/mold release agent selected from the group consisting of vegetable and animal oils and fats, the alkali metal and alkaline earth stearates and mixtures thereof.

41. The method of claim 40, said lubricant mold release agent being present at a level from about 0.1-5% by weight.

42. The method of claim 24, said formulation including a minor amount of a colorant therein.

43. The method of claim 24, said grain protein being provided as a part of a mixture including other ingredients selected from the group consisting of starch, lipids, bran and mixtures thereof.

44. The method of claim 43, said mixture comprising at least about 75% by weight of said grain protein.

45. A method of forming a biodegradable article comprising the steps of:

providing a quantity of pellets made in accordance with claim 24; and passing said pellets through injection molding equipment having a barrel and a mold to form said article, said passing step comprising the steps of rendering said pellets flowable in said barrel while maintaining the temperature of the flowable pellet material up to a maximum temperature of about 80° C., and heating said mold to a temperature of from about 120°-180° C.

* * * * *